Jan. 19, 1954  A. B. MACHADO ET AL  2,666,582
SPLIT CLEARING MECHANISM
Filed Jan. 11, 1949  3 Sheets-Sheet 1
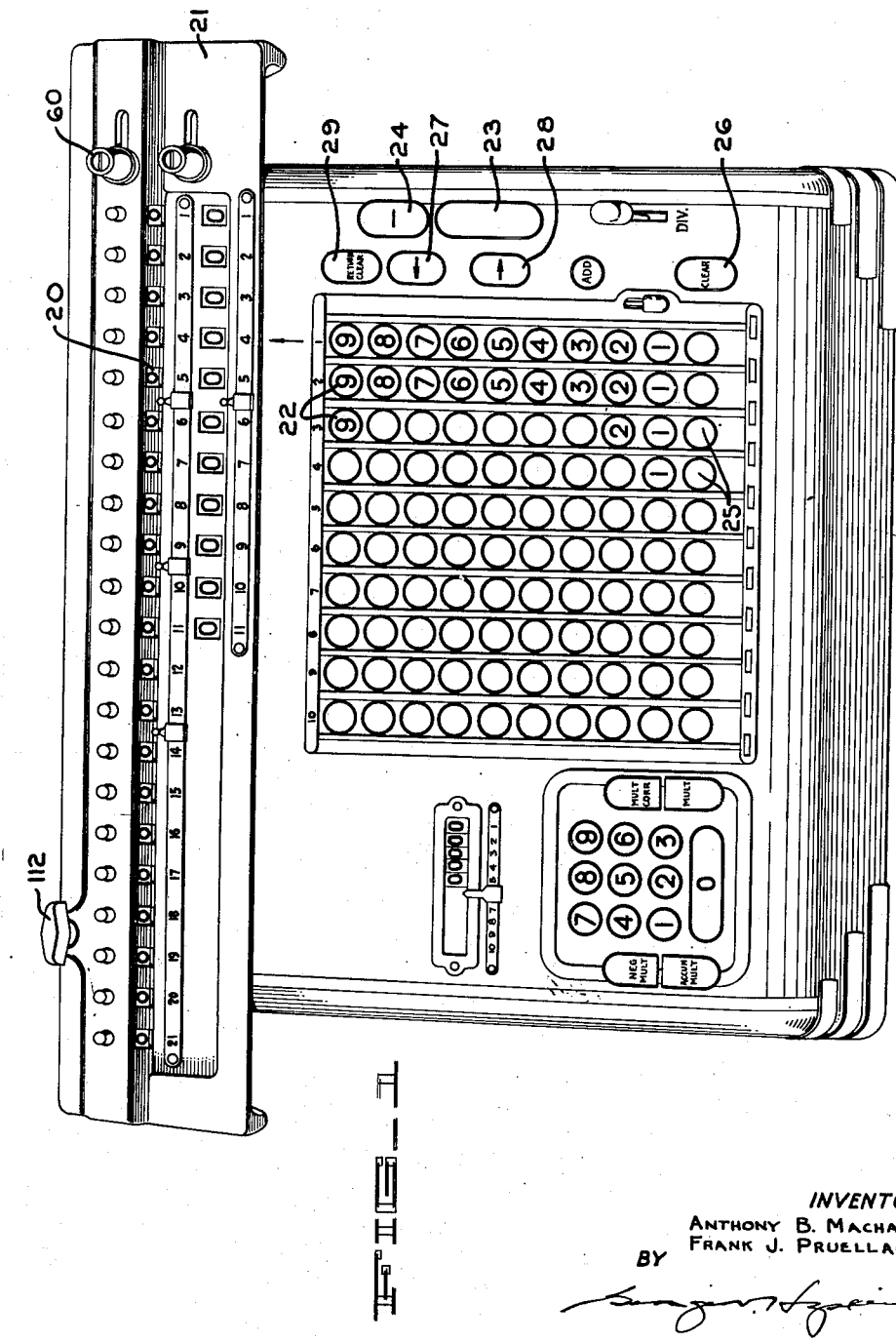
INVENTORS.
ANTHONY B. MACHADO
FRANK J. PRUELLAGE
BY

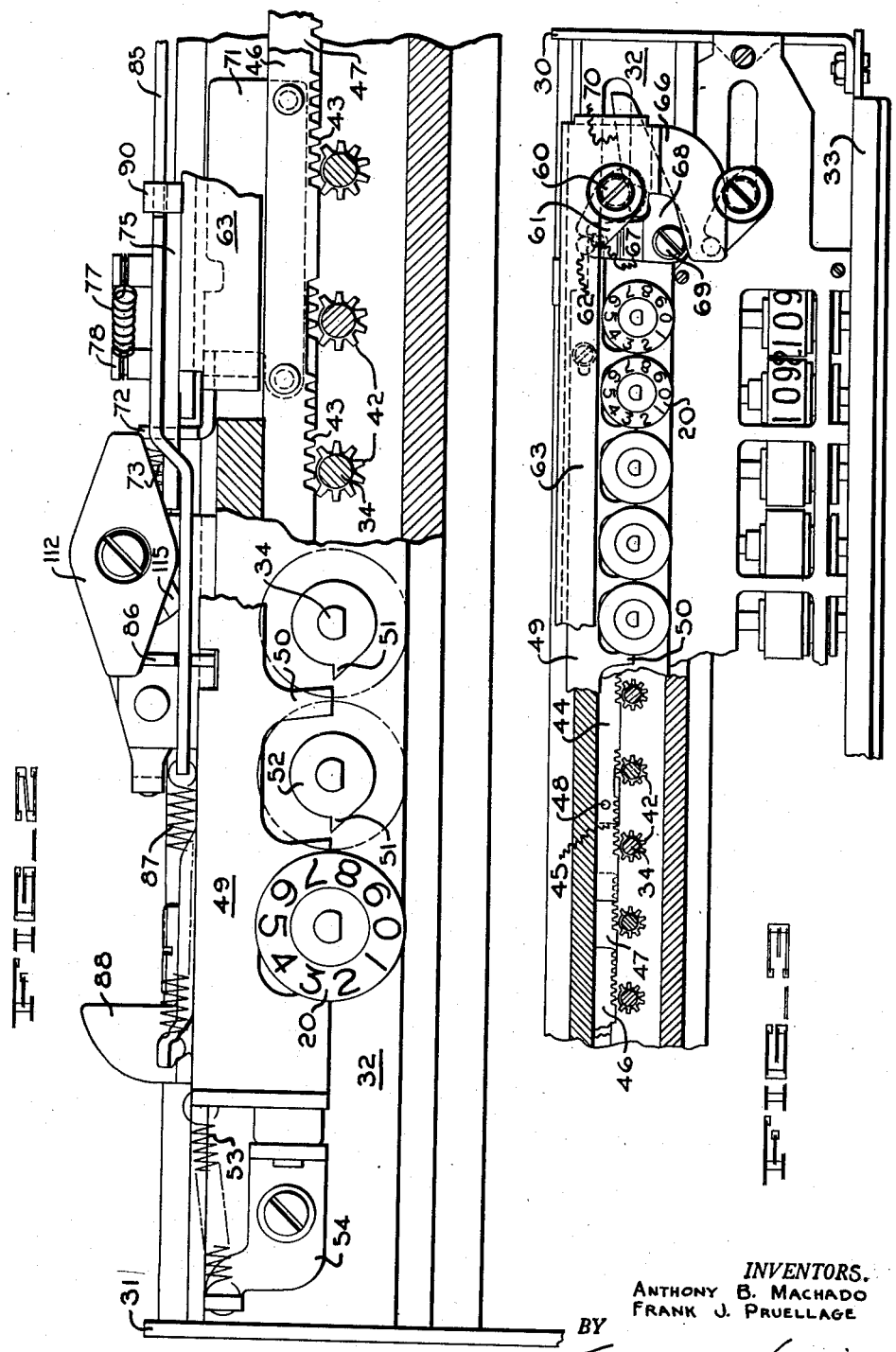

Jan. 19, 1954
A. B. MACHADO ET AL
2,666,582
SPLIT CLEARING MECHANISM
Filed Jan. 11, 1949
3 Sheets-Sheet 3
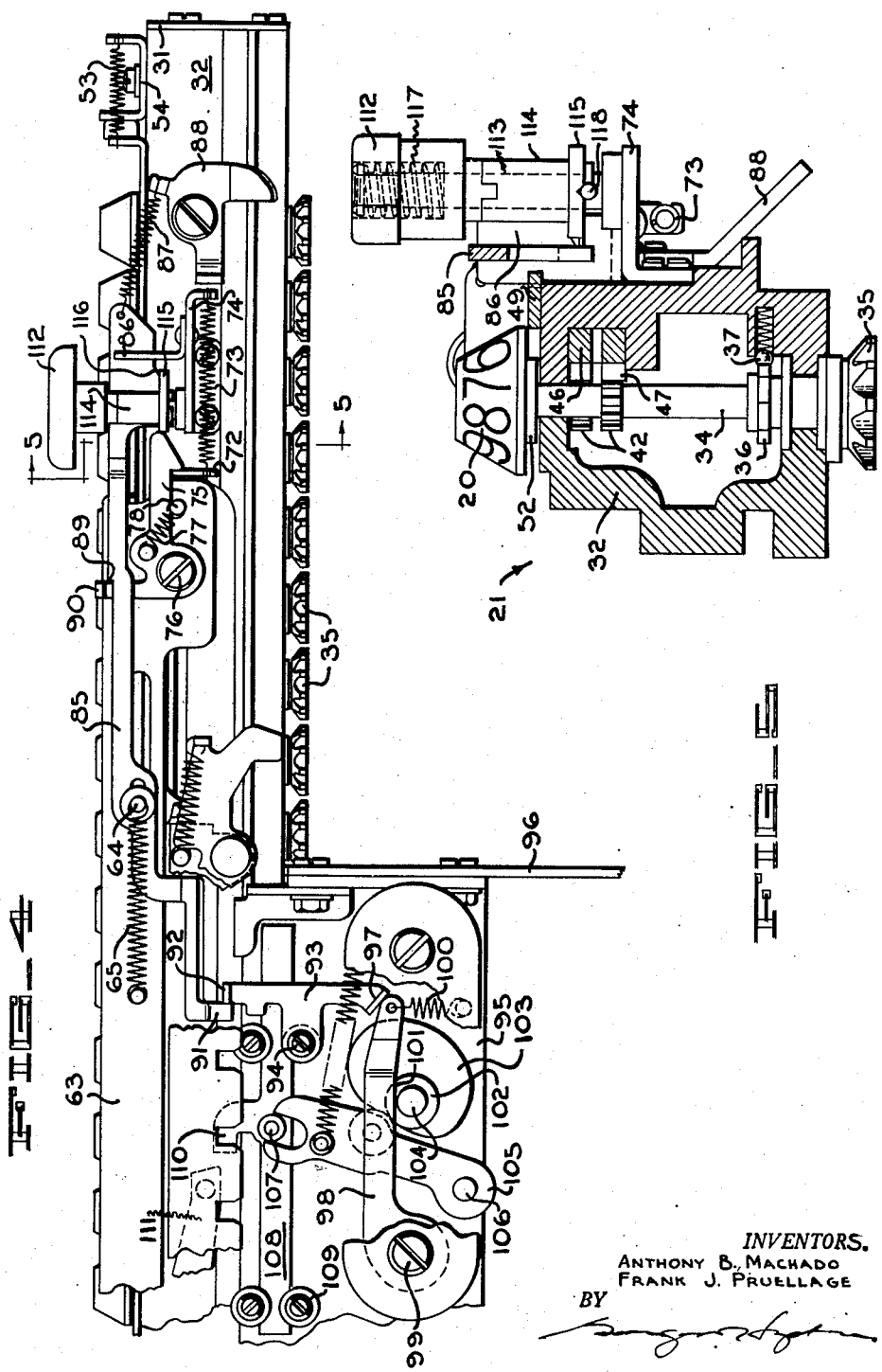
INVENTORS.
ANTHONY B. MACHADO
FRANK J. PRUELLAGE
BY Patented Jan. 19, 1954

2,666,582

UNITED STATES PATENT OFFICE 2,666,582

SPLIT CLEARING MECHANISM

Anthony B. Machado, San Leandro, and Frank J. Pruellage, Oakland, Calif., assignors to Friden Calculating Machine Co., Inc., a corporation of California Application January 11, 1949, Serial No. 70,172

8 Claims. (Cl. 235—144)

This invention relates to an improvement in the clearing or resetting mechanisms of calculating machines and, more particularly, to a clearing mechanism in which certain of the wheels of the accumulator may be cleared independently of the remainder of the wheels thereof.

Mechanisms of this type mentioned above are well known in the calculating art and have been disclosed in previously issued patents. See, for example, U. S. Patent No. 2,334,431, issued November 16, 1943, to John L. Moody, which shows a split clear mechanism for causing either the left-hand group of accumulator wheels to be cleared, the right-hand group of wheels to be cleared, or both groups of wheels to be cleared simultaneously. In the case of the machine disclosed in the above-mentioned patent, if the clear mechanism is conditioned to clear only one or the other of the two groups of wheels and it is found necessary to reset all of the accumulator wheels to zero, the operator first manipulates a control knob before performing the clearing operation in order to condition the clearing mechanism for a simultaneous resetting of both groups of wheels. If, after clearing both groups of accumulator wheels, the operator wishes to continue with the solution of problems requiring the clearance of only one group of wheels, he again manipulates the control knob so as to once again condition the clearing mechanism for a split type of clearing operation.

In order to eliminate the need for the manipulation of the control knob prior to the resetting operation, as disclosed above, a novel split-clear mechanism has been devised so that the entire accumulator may be cleared at any time by manual operation of the clearing mechanism instead of by the power-driven mechanism ordinarily used for this purpose. Thus, if the machine is set for a split-clear operation, and the operator wishes to clear all of the wheels, it is only necessary that he operate the hand clearance mechanism, thereby eliminating the double manipulation of the split-clear control knob which would otherwise be necessary.

Accordingly, it is an object of the present invention to provide an improved type of split-clear mechanism for calculating machines.

Another object of the invention is to provide a combined manual and power clearance mechanism for calculating machines which may be conditioned so as to cause clearing of only one group of numeral wheels when the mechanism is operating by power, and clearance of all of the numeral wheels when the mechanism is operated manually.

Another object of the invention is to provide a split-clear rack, the separate sections of which are normally coupled together for conjoint operation when the machine is at rest or when the rack is operated by hand, but which may be automatically uncoupled early in the power-clearing cycle of the machine so as to enable one of the sections to be operated independently of the other.

Other objects of the invention will become apparent from the following description of one possible embodiment of the invention which is shown in the accompanying drawings herein:

Figure 1 is a view of the entire machine, showing the arrangement of the various keys and the shiftable numeral wheel carriage.

Figure 2 is a plan view of the left-hand side of the carriage with parts broken away so as to more clearly illustrate the split-clear mechanism.

Figure 3 is a plan view of the right-hand side of the carriage with parts broken away so as to show the construction of the clearing mechanism.

Figure 4 is a rear elevation of the left-hand side of the machine showing the cooperation between the split-clear mechanism and the power-clearance mechanism.

Figure 5 is a cross-sectional view of the carriage taken along the line 5—5 in Figure 4.

General description of machine

In the accompanying drawings, the present invention is shown as applied to a machine of the type disclosed in U. S. Patent No. 2,229,889, issued January 28, 1941, to Carl M. Friden, to which patent reference is made for a complete disclosure of the basic machine. The calculating machine shown in the patent, and also in the present drawings, is of the rotary type, using a modified Thomas type actuating mechanism and a keyboard type of selection mechanism. As shown in Figure 1, amounts may be entered into a series of accumulator wheels 20 mounted in a shiftable carriage 21 by depressing the appropriate amount keys 22 and then depressing either plus bar 23 or minus bar 24 so as to cause the main actuating mechanism of the machine to be given a cycle of operation. The amount set up on the numeral keys 22 will thereupon be entered either positively or negatively into the accumulator wheels 20. In case an erroneous setting is made on the amount keys 22, the depressed key in any particular row may be released by the depression of an ordinal clear key 25, or the keys of the entire keyboard may be released by the depression of a keyboard clear key 26 located to the right of the amount keys 22. Suitable mechanism, including shift keys 27 and 28, is provided for shifting the carriage 21 in either direction across the machine from one ordinal position to the next. Reference is made to U. S. Patent No. 2,294,083, issued to Carl M. Friden on August 25, 1942, for a complete disclosure of the carriage shift mechanism operated under the control of the shift keys 27 and 28. The numeral wheel carriage 21 may be returned to its extreme left-hand position and the numeral wheels 20 reset to zero, upon the arrival of the carriage in this position, by depression of a return clear key 29. For a complete disclosure of this mechanism, reference is made to the above-mentioned Patent No. 2,294,083.

Referring to Figures 2 to 5, inclusive, the numeral wheel carriage indicated generally at 21 includes right and left end frames, designated by reference numerals 30 and 31, respectively, which end frames are mounted on opposite ends of a hollow frame bar 32. As shown in Figures 2 and 3, the end frames 30 and 31 also support a guide rail 33 extending across the front of the carriage, which rail serves to support and guide the carriage in its transverse movements across the machine.

As shown in Figure 5, the numeral wheels 20 of the accumulator are mounted on the upper ends of a series of numeral wheel shafts 34 which are journaled in the frame bar 32. At its lower end, each numeral wheel shaft carries a ten-tooth gear 35 by means of which values may be introduced into the numeral wheels, as disclosed in aforementioned Patent No. 2,229,889. Each shaft 34 also carries a ten-tooth star wheel 36 engaged by a spring-pressed ball 37 for aligning and maintaining the numeral wheels in any one of its ten numerical positions.

Clearing mechanism

For the purpose of enabling the numeral wheels of the accumulator to be reset to zero, each numeral wheel shaft 34 carries a resetting gear 42, these gears being offset on alternate shafts 34 as shown in Figure 5. Each gear is mutilated, as shown in Figure 2, and when the numeral wheel is in its zero position, the mutilated portion of the gear is in the position shown in Figure 2. In a clearing or resetting operation, the gears 42 are all returned to the position shown in Figure 2 by means of rack teeth 43 formed on parallel resetting members comprising rack bars as shown in Figure 5. There are two sets of the resetting rack bars in the present machine, a right-hand set 44 and 45 and a left-hand set 46 and 47. The split in the rack bars occurs between the eighth and ninth orders of the accumulator so that the numeral wheels of the first eight orders may be reset to zero independently of the higher order numeral wheels, or vice versa. The rack bars of each set are secured to one another by means of suitable spacers and studs 48.

As shown in Figures 3, 4 and 5, each pair of rack bars is mounted for longitudinal sliding movement within the hollow frame bar 32 so as to enable the rack teeth 43 to move past the mutilated gears 42 and to pick up any of the gears which are not at zero and to rotate the same until they arrive at their zero positions, as shown in Figure 2. In order to insure that the numeral wheels stop at zero without any overthrow, a stop slide 49 is mounted on the upper surface of the frame bar 32, this slide being provided with a plurality of teeth 50 which are adapted to engage stop shoulders 51 provided on discs 52, secured to the numeral wheel shafts 34 immediately below the numeral wheels 20. The slide 49 is normally held toward the left, as shown in Figure 2, by means of a tension spring 53 which is stretched between the left-hand end of the slide and a lug provided on a bracket 54 fastened to the frame bar 32.

Secured to the right-hand end of the rack bars 44 and 45 is an upstanding pin (not shown) on which is mounted a manual resetting knob 60 (see Figures 1 and 3), by means of which the rack bars 44 and 45 may be manually moved toward the right so as to cause resetting of the numeral wheels in the first eight orders of the accumulator. The resetting knob part 60 is provided with an abutment arm connection 61 which is adapted to cooperate with a stud 62 mounted on an actuating slide 63. This slide is mounted for endwise sliding movement on the frame bar 32 by means of pin and slot connections, one of which is shown in Figure 4, and is therein designated by reference numeral 64. The slide is normally maintained in its left-hand position, as viewed from the front of the machine, by means of a tension spring 65 connected between the slide and the pin 64. On its right-hand end, the slide 63 is provided with a forwardly-extending arm 66 (Figure 3) which lies in front of the resetting knob 60 so that whenever the knob 60 is moved toward the right by manual manipulation thereof, the operating slide 63 will likewise be forced toward the right against the action of the spring 65. When the knob 60 is released, the spring 65 will act to restore the rack bars 44 and 45 to their normal, or left-hand, position.

As will be described later herein, the operating slide 63 is arranged to be reciprocated by power derived from the motor-driven mechanism of the machine. Hence, when the abutment arm 61 is located in front of the stud 62, as shown in Figure 3, the rack bars 44 and 45 will be carried to the right along with the slide 63 and cause resetting of the numeral wheels in the first eight orders of the accumulator. The operation of the rack bars 44 and 45 by the slide 63 may be prevented, however, by twisting the resetting knob 60 counter-clockwise so as to remove the arm 61 from in front of the stud 62, thereby breaking the connection between the slide and the rack bars.

The stop slide 49, mentioned earlier herein, is adapted to be moved to the right against the action of the spring 53 whenever the rack bars 44 and 45 are moved toward the right for resetting the numeral wheels to zero. For this purpose, the stop slide 49 is provided on its right-hand end with a pin 67 (Figure 3) which lies within a notch provided in the rearwardly-extending arm of a bell crank 68. This bell crank is pivotally mounted on a screw 69 fastened to the frame bar 32 and is provided with a rightwardly-extending arm provided with a cam face 70 which will be engaged by the pin upon which the resetting knob 60 is mounted so as to cause clockwise rocking movement of the bell crank as the rack bars move toward the right. This movement of the bell crank will be transmitted to the stop slide 49 by means of the pin 67 and cause the slide to be moved toward the right so as to bring the teeth 50 therein into active position with respect to the stop shoulders 51. As each numeral wheel reaches its zero position, its associated stop shoulder 51 will engage with the tooth 50 on the slide 49 and hence cause the numeral wheel to be positively stopped in its zero position.

*Split-clear mechanism*

As previously explained, the rack bars 44 and 45 are associated with the lower part of the series of numeral wheels only so that operation of the resetting knob 60 always operates to reset the lowermost eight orders of the accumulator. The higher order wheels in the other part of the series can be selectively coupled for simultaneous resetting operation with the group of lower order wheels, this coupling being of such a nature that both groups of numeral wheels will alway be reset when the knob 60 is manually operated, but may be selectively conditioned for clearing of the lower order wheels only when clearing is effected by power. As shown in Figure 2, the rack bars 46 and 47 carry a bracket 71 which is provided with a formed-over ear 72. The ear 72 (see also Figure 4) is connected by a tension spring 73 with an ear provided on a bracket 74, secured to the carriage frame bar 32 so as to normally maintain the rack bars 46 and 47 in their left-hand, or normal, position. As shown in Figure 4, the operating slide 63 carries a coupling latch 75 which is pivotally mounted on a screw 76 secured to the slide 63. The latch 75 is normally held in its effective position where it engages with the ear 72 by a spring 77 which resiliently maintains the latch in contact with a pin 78 on the slide 63. Hence, when the latch is in its effective position, as shown in Figure 4, the rack bars 46 and 47 for the higher order numeral wheels will be effectively coupled to the slide 63 so that the higher order numeral wheels will be reset upon reciprocation of the slide.

Means is provided whereby the latch 75 may be disabled when the slide 63 is operated by the power resetting mechanism so as to prevent resetting of the higher order wheels along with the lower order of wheels when this is found to be desirable.

For this purpose, a latch disabling slide 85 is provided on the rear of the carriage, this slide being supported at one end by a slot formed therein which engages with the pin 64, and at the other end by a slot formed in a bracket 86 secured to the bracket 74. The slide is normally urged toward the right, as viewed in Figure 4, by means of a tension spring 87, connected between the slide and a carriage limit stop 88 secured to the frame bar 32. The upper edge of the slide 85 is provided with a shoulder 89 which is adapted to cooperate with an ear 90 formed on the latch 75. On the left-hand end of the slide 85, as viewed from the rear of the machine, there is provided a downwardly-extending finger 91 which, when the carriage is in its extreme left-hand position (right-hand position as viewed in Figure 4), lies in front of an ear 92 formed on the upper end of a lever 93 which is pivotally mounted on a screw 94 secured to a cross bar 95 which is fastened between the left side frame 96 and the right side frame (not shown) of the machine. The lever 93 is provided on its lower end with an angularly disposed ear 97 which lies over the outer end of a centralizing arm 98 pivotally mounted on a screw stud 99 secured to the cross bar 95. The arm 98 is urged downwardly by a spring 100 so as to bear against a "flat" 101 provided on the hub 102 of a power resetting cam 103. The cam 103 is mounted on a shaft 104 which is arranged to be driven from one of the actuator shafts of the machine by means of a suitable clutch mechanism, this structure being fully shown and described in the aforementioned Patent No. 2,294,083.

In a power resetting operation, the shaft 104 is rotated during cycling of the machine whereby the cam 103 oscillates a follower arm 105 which is pivotally mounted at 106 on the cross bar 95. The arm 105 is provided at its upper end with a bifurcation which engages with a roller stud 107 mounted on a slide 108 which is supported for endwise sliding movement on the cross bar 95 by means of a plurality of pivoted rollers 109. The slide 108 is provided with a projection 110 which is adapted to engage the end of an arm 111 which is pivotally mounted on the operating slide 63 as disclosed in Patent No. 2,294,083.

When the carriage 21 reaches its leftmost position as shown in Figure 4, reciprocation of the slide 108 by the cam 103 will cause the operating slide 63 to be moved toward the right (to the left as viewed in Figure 4) due to the engagement of the arm 111 by the projection 110. Also, the "flat" 101 on the hub 102 will cause the arm 98 to be rocked counter-clockwise, as viewed in Figure 4, thereby rocking the lever 93 counter-clockwise so as to cause the slide 85 to be moved toward the left as viewed in Figure 4. With the parts positioned as shown in Figure 4, this movement of the slide 85 will be an idle one inasmuch as the shoulder 89 lies below the ear 90 on latch 75 and will pass idly beneath the ear when the slide is operated. Hence, the latch 75 will not be disabled and the reciprocation of the operating slide 63 will cause resetting of the higher order numeral wheels.

In the event that the operator wishes to prevent the resetting of the higher order numeral wheels during a power clear operation, he may achieve this result by rotating a split-clearing knob 112 counter-clockwise, as viewed in Figures 1 and 2, so as to elevate the slide 85. The knob 112 is rotatively journalled on a pin 113 (see Figure 5) which is mounted in an upright position on the bracket 74. Also journalled on pin 113, immediately beneath the knob 112, is a sleeve 114 which is clutched to the knob 112 for operation thereby and carries at its lower end a cam 115 which is adapted to engage with an inclined surface 116 (Figure 4) provided on the latch disabling slide 85 when the knob is rotated counter-clockwise. The knob 112 and sleeve 114 are resiliently urged downwardly on the pin 113 by a compression spring 117 located within a recess provided in the knob so as to resiliently urge a V-shaped notch provided in the lower end of the sleeve into engagement with a pin 118 extending transversely through the pin 113. A second V-shaped notch is provided in the sleeve 114 for locating the cam 115 in its latch-disabling position.

When the knob 112 is rotated counter-clockwise, as viewed in Figures 1 and 2, so as to elevate the slide 85 and thereby move the shoulder 89 into engagement with the ear 90 on the latch 75, the latch will be disabled by the slide 85 at the outset of the power clearing cycle during the time that the projection 110 is moving toward engagement with the end of the arm 111. Hence, by the time that the operating slide 63 begins moving toward the left, as viewed in Figure 4, the latch 75 will have been disengaged from the ear 72 and the rack bars 46 and 47 for the higher order numeral wheels will remain at rest during movement of the slide 63.

*Operation*

From the foregoing description, it will be noted that whenever the resetting knob 60 is manually moved toward the right, both sets of rack bars will be operated so as to cause simultaneous clearing of both groups of numeral wheels. That is, the latch 75 is normally effective to couple the two sets of rack bars together, and can only be disabled by operation of the power resetting mechanism.

When the split-clear knob 112 is in the position shown in Figures 1 and 2, and the return clear key 29 is depressed, the carriage 21 will be shifted to its extreme left-hand position, after which the projection 119 (Figure 4) will engage the arm 111 and cause reciprocation of the operating slide 63. Assuming the resetting knob 60 to be in the angular position shown in Figure 3 where the arm 61 lies in front of the stud 62 on the slide 63, the movement of the slide 63 will cause both sets of rack bars to be operated and will cause simultaneous clearing of both groups of numeral wheels since the latch 75 will not be disabled when the slide 85 is in its lower position. However, if the operator twists the knob 112 counter-clockwise and then subsequently depresses the return clear key 29, the accumulator wheels in the first eight orders will be reset, but the remaining accumulator wheels will remain at their previous settings. This will result from the fact that the latch-disabling slide 85 will be lifted against the action of the spring 87 when the knob 112 is turned counter-clockwise so as to bring the shoulder 89 into engagement with the ear 90, thus conditioning the slide 85 for disabling the latch 75. Hence, at the very outset of the clearing cycle, the latch 75 will be released from the ear 72 due to the lifting of the centralizing arm 98 by the "flat" 101 on the hub of the resetting cam 103.

It will thus be noted that while the machine may be conditioned for a split-clear operation so as to cause clearing of only one group of numeral wheels whenever the return clear key 29 is depressed, the operator may, if he wishes, cause all of the dials to be cleared, irrespective of the setting of the knob 112, by manually operating the resetting knob 60. This eliminates the necessity for a double manipulation of the split-clear knob 112 in cases where it is desirable to clear all of the numeral wheels after a particular point in the calculations has been reached, and to then restore the machine to its previous condition so as to again cause the clearing mechanism to be split.

It is to be noted that numbers may be accumulated either in the left-hand group of numeral wheels while the right-hand group of wheels is reset by use of the split-clear mechanism or, alternatively, numbers may be accumulated in the lower order group of wheels while the higher order wheels are periodically reset to zero. The last-mentioned type of operation can be secured by twisting the reset knob 60 counter-clockwise so as to uncouple the rack bars 44 and 45 from the operating slide 63 and locating the knob 112 in the position shown in Figures 1 and 2. With this setting of the knobs, the operation of the power clear mechanism will cause operation of the rack bars 46 and 47, but not the rack bars 44 and 45 and hence only the left-hand group of accumulator wheels will be cleared. Here again, however, both groups of wheels may be reset by operation of the knob 60 which, in this case, will pick up the operating slide 63 and through the latch 75 cause operation of the rack bars 46 and 47, thereby causing simultaneous clearing of all numeral wheels.

While the form of mechanism herein shown and described is well adapted to fulfill the objects of the present invention, it is to be understood that it is not intended that the invention shall be confined to the particular form or embodiment herein disclosed since it is capable of embodiment in various forms, all coming within the scope of the claims which follow.

We claim:

1. In a machine of the class described having a register comprising a single series of numeral wheels adapted in one type of machine operation to have entered therein two totals accumulated separately in two different parts of said series of numeral wheels, and in another type of machine operation to accumulate a single total with ordinal values thereof registered in both of said two parts of said series of numeral wheels and means for introducing numerical values into said wheels, the combination of separate means for resetting the wheels in each part of said series to zero; a common operating member for both of said resetting means; a cyclically operable power driving means; a lost motion driving connection between said power driving means and said common operating member so as to cause a slight delay in the operation of said member by said driving means; means for connecting said common operating member with one of said resetting means so as to cause the associated numeral wheels to be reset to zero whenever said common operating member is operated; normally effective means for connecting said common operating member with the other of said resetting means so as to cause the associated numeral wheels to be reset to zero whenever said common operating member is operated; and means operated by said power driving means during the early part of its cycle for disabling said normally effective means prior to movement of said common operating member by said driving means.

2. In a machine of the class described having a register comprising a single series of numeral wheels adapted in one type of machine operation to have entered therein two totals accumulated separately in two different parts of said series of numeral wheels, and in another type of machine operation to accumulate a single total with ordinal values thereof registered in both of said two parts of said series of numeral wheels and means for introducing numerical values into said wheels, the combination of separate means for resetting the wheels in each part of said series to zero; a common operating member for both of said resetting means; a cyclically operable power driving means; a lost motion driving connection between said power driving means and said common operating member so as to cause a slight delay in the operation of said member by said driving means; means for connecting said common operating member with one of said resetting means so as to cause the associated numeral wheels to be reset to zero whenever said common operating member is operated; normally effective means for connecting said common operating member with the other of said resetting means so as to cause the associated numeral wheels to be reset to zero whenever said common operating member is operated; means operated by said power driving means during the early part of its cycle for disabling said normally effective means prior to movement of said common operating member by said driving means; and selectively operable means for rendering said last-named means ineffective to disable said normally effective means.

3. In a machine of the class described having a register comprising a single series of numeral wheels adapted in one type of machine operation to have entered therein two totals accumulated separately in two different parts of said series of numeral wheels, and in another type of machine operation to accumulate a single total with ordinal values thereof registered in both of said two parts of said series of numeral wheels and means for introducing numerical values into said wheels, the combination of separate means for resetting the wheels in each part of said series to zero; a manually operable member for operating said resetting means; means for connecting said manually operable member with one of said resetting means for causing the associated wheels to be reset to zero whenever said member is operated; a device carried by said member for connecting said member with the other of said resetting means so as to normally cause the associated wheels to be reset to zero whenever said member is operated; a cyclically operable power driving means; a lost motion driving connection between said power driving means and said member so as to cause a time delay in the operation of said member by said driving means; means, including an element operated by said power driving means during the early part of its cycle for disabling said connecting device prior to movement of said member by said driving means, said element having a position in which it is effective to disable said connecting device and a position in which it is ineffective to disable said device; and a manipulative member for determining the position of said element.

4. In a calculating machine having a register for accumulating values, said register comprising a series of numeral wheels arranged in a row and adapted in one type of machine operation to have entered therein two totals accumulated separately in two different parts of the said series of numeral wheels, and in another type of machine operation to accumulate a single total with ordinal values thereof registered in both of said two parts of said series; zero resetting means including two movable members, movement of one of said movable members causing the numeral wheels in one part of said series of numeral wheels to be reset to zero and movement of the other of said movable members causing the numeral wheels in the other part of said series of numeral wheels to be reset to zero; cyclically operable power driven means; an actuating member operable by said power driven means to effect movement of said one of said movable members; a normally engaged but disengageable coupling between said actuating member and said other of said movable members; means for disabling said coupling; means operable during the early part of a single cycle of said power driven means for actuating said disabling means; means operable during a later part of the same cycle of said power driven means for operating said actuating member; and manipulatable means for selectively rendering said disabling means effective or ineffective for disabling said coupling when said disabling means is operated.

5. In a calculating machine having a register for accumulating values, said register comprising a series of numeral wheels arranged in a row and adapted in one type of machine operation to have entered therein two totals accumulated separately in two different parts of the said series of numeral wheels, and in another type of machine operation to accumulate a single total with ordinal values thereof registered in both of said two parts of said series; zero resetting means including two movable members, movement of one of said movable members causing the numeral wheels in one part of said series of numeral wheels to be reset to zero and movement of the other of said movable members causing the numeral wheels in the other part of said series of numeral wheels to be reset to zero; power driven means; an actuating member operable by said power driven means; a connection between said actuating member and one of said movable members; a latch for coupling said actuating member to the other of said movable members; selectively conditionable disabling means operable by said power driven means for moving said latch to a position in which it is ineffective for coupling said actuating member to said other of said movable members; and means for conditioning said selectively conditionable means for causing the operation thereof to move said latch to its ineffective position.

6. In a calculating machine having a register for accumulating values, said register comprising a series of numeral wheels arranged in a row and adapted in one type of machine operation to have entered therein two totals accumulated separately in two different parts of the said series of numeral wheels, and in another type of machine operation to accumulate a single total with ordinal values thereof registered in both of said two parts of said series; zero resetting means including two movable members, movement of one of said movable members causing the numeral wheels in one part of said series of numeral wheels to be reset to zero and movement of the other of said movable members causing the numeral wheels in the other part of said series of numeral wheels to be reset to zero; power driven means; an actuating member operable by said power driven means; a connection between said actuating member and one of said movable members; a latch for coupling said actuating member to the other of said movable members; selectively conditionable disabling means operable by said power driven means for moving said latch to a position in which it is ineffective for coupling said actuating member to said other of said movable members; means for conditioning said selectively conditionable means for causing the operation thereof to move said latch to its ineffective position; and manually operable control means for operating said actuating member, irrespective of the condition of said selectively conditionable disabling means, for thereby moving both of said movable members, and thus resetting the numeral wheels in both parts of said series of wheels.

7. In a calculating machine having a register for accumulating values, said register comprising a series of numeral wheels arranged in a row and adapted in one type of machine operation to have entered therein two totals accumulated separately in two different parts of the said series of numeral wheels, and in another type of machine operation to accumulate a single total with ordinal values thereof registered in both of said two parts of said series; zero resetting means including two movable members, movement of one of said movable members causing the numeral wheels in one part of said series of numeral wheels to be reset to zero and movement of the other of said movable members causing the numeral wheels in the other part of said series of numeral wheels to be reset to zero; power driven means; a reciprocable actuating slide operable by said power driven means; means connecting said slide to one of said movable members; a latch movably mounted on said slide and normally coupling said slide to the other of said movable members; a latch-disabling member; a manipulatable member for selectively setting said latch-disabling member into or out of cooperative relation with said latch; and means drivable by said power driven means for operating said latch-disabling member so as to disable said latch when said latch-disabling member has been set in cooperative relation with said latch.

8. In a calculating machine having a register for accumulating values, said register comprising a series of numeral wheels arranged in a row and adapted in one type of machine operation to have entered therein two totals accumulated separately in two different parts of the said series of numeral wheels, and in another type of machine operation to accumulate a single total with ordinal values thereof registered in both of said two parts of said series; zero resetting means including two movable members, movement of one of said movable members causing the numeral wheels in one part of said series of numeral wheels to be reset to zero and movement of the other of said movable members causing the numeral wheels in the other part of said series of numeral wheels to be reset to zero; power driven means; a reciprocable actuating slide operable by said power driven means; means connecting said slide to one of said movable means; a latch movably mounted on said slide and normally coupling said slide to the other of said movable members; a latch-disabling member; a manipulatable member for selectively setting said latch-disabling member into or out of cooperative relation with said latch; means drivable by said power driven means for operating said latch-disabling member so as to disable said latch when said latch-disabling member has been set in cooperative relation with said latch; and manually operable means for operating said slide for moving both of said movable members irrespective of the setting of said latch-disabling member by said manipulatable member, and thus resetting the numeral wheels in both parts of said series of wheels.

ANTHONY B. MACHADO.
FRANK J. PRUELLAGE.

References Cited in the file of this patent

UNITED STATES PATENTS

| Number | Name | Date |
| --- | --- | --- |
| 1,875,437 | Friden | Sept. 6, 1932 |
| 2,334,431 | Moody | Nov. 16, 1943 |
| 2,363,737 | Machado | Nov. 28, 1944 |
| 2,403,111 | Moody | July 2, 1946 |